(12) United States Patent
Merchant et al.

(10) Patent No.: US 12,704,091 B2
(45) Date of Patent: Aug. 11, 2026

(54) ANTI-ICING AND BLEED HEAT SYSTEM FOR A GAS TURBINE SYSTEM

(71) Applicant: GE Infrastructure Technology LLC, Greenville, SC (US)

(72) Inventors: Laxmikant Merchant, Bengaluru (IN); Senthilkumar Jeyaraj, Bengaluru (IN)

(73) Assignee: GE INFRASTRUCTURE TECHNOLOGY LLC, SC (US)

( * ) Notice: Subject to any disclaimer, the term of this patent is extended or adjusted under 35 U.S.C. 154(b) by 62 days.

(21) Appl. No.: 18/524,274

(22) Filed: Nov. 30, 2023

(65) Prior Publication Data

US 2025/0059914 A1 Feb. 20, 2025

(30) Foreign Application Priority Data

Aug. 16, 2023 (IN) ............................. 202311055021

(51) Int. Cl.
*F02C 7/047* (2006.01)

(52) U.S. Cl.
CPC .......... *F02C 7/047* (2013.01); *F05D 2260/20* (2013.01); *F05D 2260/83* (2013.01)

(58) Field of Classification Search
CPC .... F02C 7/047; F02C 7/04; F02C 6/08; F02C 7/045; F05D 2260/20; F05D 2260/83; B64D 2033/0233
See application file for complete search history.

(56) References Cited

U.S. PATENT DOCUMENTS

| | | | | |
|---|---|---|---|---|
| 7,484,369 B2 * | 2/2009 | Myhre | G01J 5/0088 60/803 |
| 9,359,951 B2 | 6/2016 | Merchant et al. | |
| 10,022,660 B2 * | 7/2018 | Santini | B01D 46/62 |
| 10,704,464 B2 | 7/2020 | Saraswathi et al. | |
| 10,801,406 B2 | 10/2020 | Ponyavin et al. | |
| 2004/0001751 A1 * | 1/2004 | Poccia | F02C 7/08 415/135 |
| 2008/0298957 A1 * | 12/2008 | Chillar | F02C 7/143 62/401 |
| 2010/0101209 A1 * | 4/2010 | Feher | F02C 6/08 60/266 |
| 2011/0162383 A1 | 7/2011 | Zhang et al. | |
| 2015/0068217 A1 * | 3/2015 | Merchant | F02C 7/08 60/785 |
| 2017/0234220 A1 | 8/2017 | Saraswathi et al. | |
| 2018/0274445 A1 | 9/2018 | Sankarakumar et al. | |
| 2019/0153961 A1 * | 5/2019 | Honma | F02C 1/02 |
| 2021/0222583 A1 * | 7/2021 | Saraswathi | F02C 7/047 |
| 2022/0195921 A1 * | 6/2022 | Gomez | F02C 7/047 |
| 2022/0195922 A1 * | 6/2022 | Gomez | F02C 7/047 |

* cited by examiner

*Primary Examiner* — Courtney D Heinle
*Assistant Examiner* — Andrew Thanh Bui
(74) *Attorney, Agent, or Firm* — Fletcher Yoder, PC

(57) ABSTRACT

An anti-icing system for a gas turbine system includes a plurality of nozzles and a bypass conduit. Each nozzle of the plurality of nozzles includes one or more outlets that are configured to inject a first portion of a heated fluid into an airflow within an air intake conduit of the gas turbine system upstream of a filter. The bypass conduit is configured to direct a second portion of the heated fluid into the airflow within the air intake conduit downstream of the filter.

18 Claims, 4 Drawing Sheets

ANTI-ICING AND BLEED HEAT SYSTEM FOR A GAS TURBINE SYSTEM

CROSS-REFERENCE TO RELATED APPLICATION

This application claims priority to and benefit of India Application No. 202311055021, filed on Aug. 16, 2023; entitled "ANTI-ICING AND BLEED HEAT SYSTEM FOR A GAS TURBINE SYSTEM", which is herein incorporated by reference in its entirety.

BACKGROUND

The subject matter disclosed herein relates to an anti-icing and bleed heat system for a gas turbine system.

In general, a gas turbine system includes a compressor, one or more combustors, and an expansion turbine to generate electrical power. More particularly, the compressor compresses air to generate a compressed air that is directed to the one or more combustors. The one or more combustors mix the compressed air and a fuel to produce high temperature combustion gases. The combustion gases are directed into the expansion turbine to drive rotation of turbine blades and a shaft that is coupled to the turbine blades. The rotation of the shaft may drive a load, such as an electrical generator that is coupled to the shaft, as well as rotation of compressor blades coupled to the shaft.

In cold weather conditions or environments, ice can accumulate on the inlet filter housing through which air is drawn into the compressor. Such accumulations can negatively impact compressor performance and overall gas turbine system efficiency.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In one embodiment, an anti-icing system for a gas turbine system includes a plurality of nozzles and a bypass conduit. Each nozzle of the plurality of nozzles includes one or more outlets that are configured to inject a first portion of a heated fluid into an airflow within an air intake conduit of the gas turbine system upstream of a filter. The bypass conduit is configured to inject a second portion of the heated fluid into the airflow within the air intake conduit downstream of the filter.

In one embodiment, a gas turbine system includes a compressor and an air intake system. The air intake system includes an air intake conduit, a filter system, and an anti-icing system and is configured to supply a heated airflow to the compressor. The anti-icing system includes a plurality of nozzles and a bypass conduit. Each nozzle of the plurality of nozzles includes one or more outlets that are configured to inject a first portion of a heated fluid into an airflow within the air intake conduit upstream of the filter system. The bypass conduit is configured to inject a second portion of the heated fluid into the airflow within the air intake conduit downstream of the filter system.

In one embodiment, a method of operating an anti-icing system for a gas turbine system includes extracting a heated fluid from a compressor of a gas turbine system; injecting, via a plurality of nozzles, a first portion of the heated fluid into an airflow within an air intake conduit of a gas turbine system upstream of a filter; and injecting, from a bypass conduit, a second portion of the heated fluid into the airflow within the air intake conduit of the gas turbine system downstream of the filter.

BRIEF DESCRIPTION OF THE DRAWINGS

These and other features, aspects, and advantages of the present anti-icing system and method will become better understood when the following detailed description is read with reference to the accompanying drawings in which like characters represent like parts throughout the drawings, wherein.

DETAILED DESCRIPTION

Figure 1:
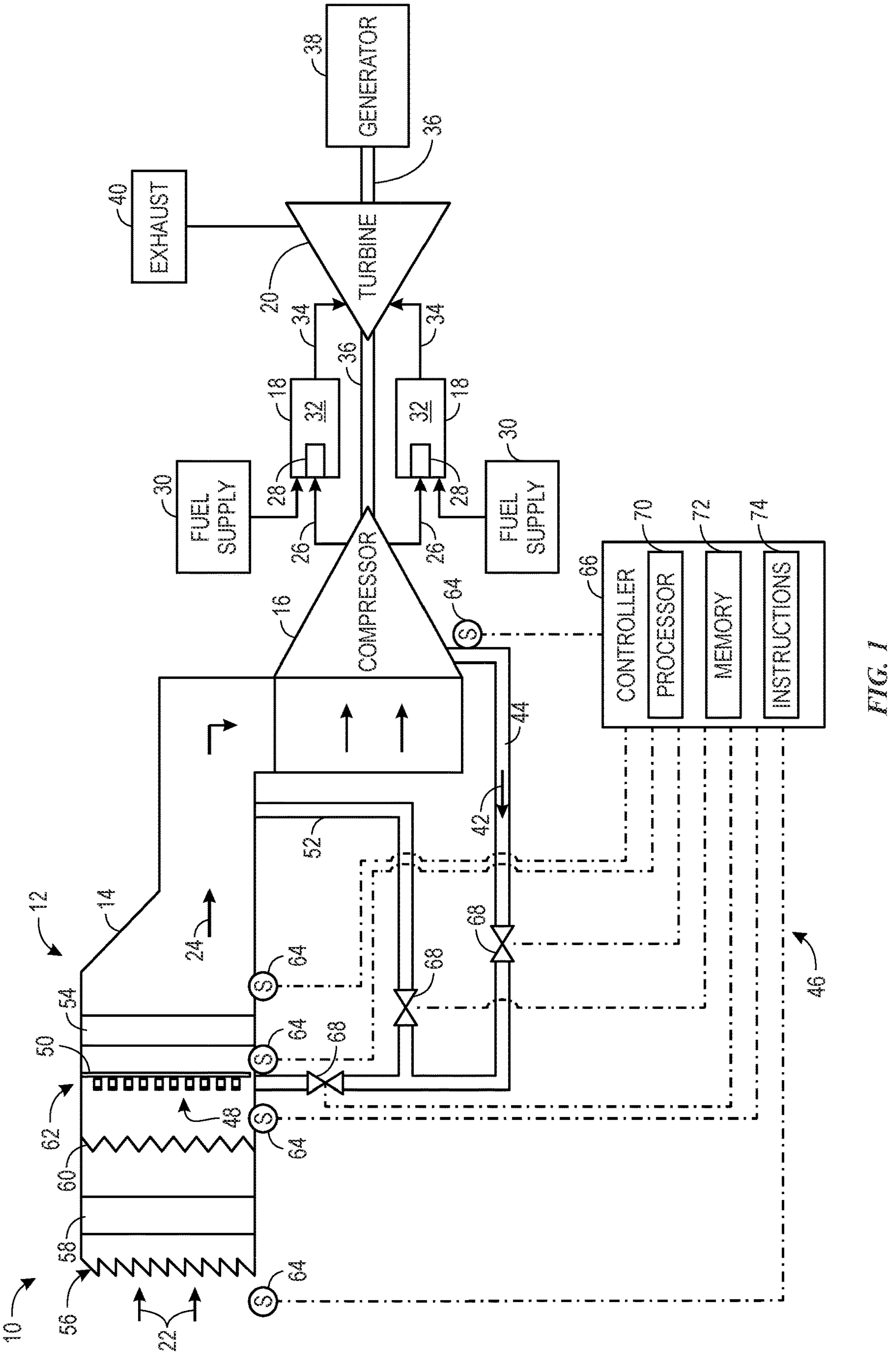
FIG. 1 is a block diagram of a gas turbine system having an air intake system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

A gas turbine system receives an airflow (e.g., ambient airflow) through an air intake system, which directs the airflow to a compressor of the gas turbine system. The disclosed embodiments relate to an anti-icing system that is configured to block a buildup of ice on a filter within the air intake system. The anti-icing system includes nozzles configured to inject heated fluid to heat the airflow in order to form a heated airflow that increases a temperature adjacent to the filter within the air intake system and that prevents the buildup of ice on the filter within the air intake system, as well as a bypass conduit that provides heated fluid to the air intake conduit downstream of the filter. The anti-icing system may also include a bleed conduit for directing a flow of heated fluid extracted from the compressor toward the air intake of the gas turbine system. The bleed conduit may include one or more valves, which may be controlled by a controller, to control the flow of heated fluid through the bleed conduit and into a manifold fluidly coupled to the nozzles and a bypass conduit. The manifold may receive a first flow of heated fluid and distribute the first flow of heated fluid to multiple nozzles. The bypass conduit may be configured to receive a second flow of heated fluid and inject the second flow of heated fluid into the air intake conduit downstream of the filters to further heat the airflow after it passes through the filters.

The anti-icing system is generally described as being used during cold ambient conditions to heat the airflow using the heated fluid to increase the temperature of the airflow (e.g., to turn the airflow into the heated airflow for anti-icing functionality). However, to facilitate discussion, it should be appreciated that the anti-icing system may be more generally referred to as an inlet bleed heat (IBH) system, which may advantageously exchange heat between the airflow and the heated fluid in a manner that blocks extremely high temperatures (e.g., hot spots that exceed a high temperature limit for the filter) at the filter of the air intake system during other conditions (e.g., hot ambient conditions and/or IBH maximum flow conditions). Thus, the anti-icing system may also protect the filter from experiencing localized areas of extremely high temperatures that may otherwise result in early degradation of material of the filter and/or damage (e.g., burn) to the material of the filter.

For example, the anti-icing system may heat the airflow such that at least 55 percent (or at least 60, 70, 80, 90, or 95 percent) of the face of the filter is heated by the heated airflow having a respective temperature that is at least 2 degrees Celsius (or at least 3, 4, or 5 degrees Celsius) greater than a dew point temperature of the air, and the anti-icing system may also heat the airflow by injecting the heated fluid such that less than 50 percent (or less than 40, 30, 20, 10, or 5 percent) of the face of the filter is heated to the extremely high temperatures (e.g., hot spots of more than 75 or 80 degrees Celsius extend across less than 50 percent of the filter face of the filter or are completely eliminated).

Turning now to the drawings, FIG. 1 is a block diagram of an embodiment of a gas turbine system 10 (e.g., gas turbine engine). The gas turbine system 10 includes an air intake system 12 having an air intake conduit 14 (e.g., housing). The gas turbine system 10 also includes a compressor 16, one or more combustors 18, and a turbine 20 (e.g., an expansion turbine). The gas turbine system 10 intakes an airflow 22 (e.g., ambient air) into the air intake system 12, mixes the airflow 22 with a heated fluid within the air intake system 12 to form a heated airflow 24, compresses the heated airflow 24 through the compressor 16 to form a compressed airflow 26, and combusts a fuel with the compressed airflow 26 in the one or more combustors 18. Each combustor 18 has one or more fuel nozzles 28 configured to inject a liquid fuel and/or a gaseous fuel (e.g., natural gas or syngas) from one or more fuel supplies 30 into a combustion chamber 32. Although not shown, in some embodiments, the fuel nozzles 28 may include primary and secondary fuel nozzles that inject fuel at a primary fuel injection zone and a secondary fuel injection zone, respectively.

Each combustor 18 combusts the fuel injected by the fuel nozzles 28 with the compressed airflow 26 to create hot, pressurized combustion gases 34, which are then directed into the turbine 20. The turbine 20 has turbine blades coupled to a shaft 36, which is coupled to a load such as an electric generator 38. As the combustion gases 34 flow into and through the turbine 20, the combustion gases 34 drive rotation of the turbine blades and the shaft 36, thereby driving the electric generator 38. In some embodiments, the shaft 36 may be connected to another load, such as machinery, a propeller of an aircraft or ship, or a compressor. Eventually, the combustion gases 34 exit the gas turbine system 10 as exhaust gases via an exhaust section 40 (e.g., an exhaust diffuser, an exhaust duct, an exhaust stack or tower, an emissions control system such as a selective catalytic reduction (SCR) system, etc.). In the illustrated embodiment, the shaft 36 is coupled to a compressor shaft of the compressor 16, which has compressor blades coupled to the compressor shaft in one or more stages (e.g., 1 to 30 stages in different axial positions). The rotation of the compressor blades within the compressor 16 causes compression of the airflow 24 from the air intake system 12.

Furthermore, the gas turbine system 10 also extracts or bleeds a portion of the compressed airflow (e.g., the heated fluid or a heated fluid flow, as indicated by arrow 42) from the compressor 16 through an extraction or bleed conduit 44 to an anti-icing system 46 (e.g., an inlet bleed heat (IBH) system). In particular, the anti-icing system 46 includes multiple nozzles 48 (e.g., anti-icing nozzles; inlet bleed heat (IBH) nozzles), a manifold 50 (e.g., an inlet bleed heat (IBH) manifold), and one or more bypass conduits 52. The heated fluid from the bleed conduit 44 is provided into the manifold 50, which delivers the heated fluid to the multiple nozzles 48, which spray the heated fluid into the airflow 22 to form the heated airflow 24. Some of the heated fluid may be directed through the one or more bypass conduits 52 and injected into the air intake conduit 14 downstream of one or more filters 54 to further heat the heated airflow 24. As discussed in more detail below, the anti-icing system 46 may include one or more valves 68 for controlling the flow of the heated fluid through the manifold 50 and the bypass conduit 52 so as to block a buildup of ice on the filter 54 and/or to generally maintain the heated airflow 24 at a temperature that is within desirable limits across a face of the filter 54 (e.g., across all or most of the face of the filter 54) to enable proper operation of the air intake system 12 and to provide satisfactory performance of the gas turbine system 10.

The bleed conduit 44 may be one or more bleed conduits that are coupled to the compressor 16 at or downstream from each, some, or one of the one or more compressor stages. The compressor 16 increases the pressure and temperature of the compressed airflow 26 with each subsequent compressor stage, and thus the bleed conduit 44 may extract the compressed airflow 26 at a particular compressor stage with a suitable pressure and temperature for use in the anti-icing system 46. In certain embodiments, the anti-icing system 46 may selectively extract the compressed airflow 26 (e.g., as the heated fluid, as indicated by arrow 42) through the bleed conduit 44 based on a temperature (e.g., monitored by one or more sensors 64, labeled "S" in FIG. 1) of the airflow 22 entering the air intake system 12, a temperature of the heated airflow 24 at the filter 54, and/or a temperature of the heated airflow 24 at the compressor 16. For example, with a progressively lower ambient temperature, the anti-icing system 46 may extract the compressed airflow through a greater number of bleed conduits 44 and/or through bleed conduits 44 at progressively later compressor stages of the compressor 16.

In operation, the air intake system 12 receives the airflow 22 through an air hood 56 coupled to the air intake conduit 14. In some embodiments, the airflow 22 may pass through or across one or more additional air intake components, such as multiple silencer baffles 58, one or more coalescers 60, the nozzles 48, the manifold 50, and the filter 54. Together, the nozzles 48 and the manifold 50 may be considered an anti-icing assembly 62 (e.g., inlet bleed heat (IBH) assembly).

As noted above, the anti-icing system 46 also includes multiple sensors 64 that are configured to monitor operational conditions, such as the temperature, humidity, or various conditions conducive to ice formation. For example, the anti-icing system 46 may include one or more sensors 64 positioned at or outside of the air hood 56 to thereby monitor ambient conditions of the air (e.g., ambient temperature, humidity, etc.). The anti-icing system 46 may include one or more sensors 64 positioned at or upstream of the manifold 50, such as between the manifold 50 and the air hood 56. The anti-icing system 46 also may include one or more sensors 64 positioned at or downstream from the manifold 50, such as at the filter 54 or between the manifold 50 and the filter 54. Furthermore, the anti-icing system 46 may include one or more sensors 64 positioned downstream of the filter 54, such as at or upstream of the intake of the compressor 16. The anti-icing system 46 also may include one or more sensors 64 disposed along each of the bleed conduits 44.

The anti-icing system 46 also includes a controller 66 communicatively coupled to the sensors 64, one or more valves 68 disposed along each bleed conduit 44, valves 68 that control the flow of fluid into the manifold 50 and the bypass conduit 52, as well as various components of the gas turbine system 10 (e.g., valves that control a supply of the fuel from the fuel supply 30 to the fuel nozzles 28). The controller 66 has a processor 70, a memory 72, and computer-readable instructions 74 stored on the memory 72 and executable by the processor 70. The controller 66 obtains sensor readings from the sensors 64, and the controller 66 may use the computer-readable instructions 74 to regulate the operation of the anti-icing system 46 based on these sensor readings, upper and lower thresholds for temperature (e.g., desirable limits or targets), computer models, and/or user input.

For example, if the temperature at one or more of the sensors falls below a lower temperature threshold (e.g., 0 degrees Celsius, a dew point of the airflow 22, or some threshold temperature relative to the dew point of the airflow 22), then the controller 66 may send a control signal to an actuator (e.g., an electric actuator) of one or more of the valves 68 to partially or entirely open the valve 68 to enable a flow of the heated fluid to pass through the bleed conduit 44 to the manifold 50 and/or the bypass conduit 52. In other embodiments, the controller 66 may adjust one or more valves to adjust the ratio of the flow rates of heated fluid flowing to the manifold 50 and the bypass conduit 52 to adjust the ratio of how much heating of the airflow 22 occurs upstream of the filter 54 and downstream of the filter 54. Although FIG. 1 illustrates the compressed airflow from the compressor 16 as the heated fluid supplied to the manifold 50, certain embodiments of the anti-icing system 46 may be additionally or alternatively coupled to one or more other sources of heated fluid (e.g., other sources of heated airflow, exhaust gas).

In this way, the controller 66 may monitor the anti-icing system 46 and control the flowrate and/or the temperature of the heated fluid into the manifold 50 (and through the nozzles 48 into the air intake conduit 14) and into the bypass conduit 52, thereby adjusting the temperature in the air intake conduit 14 to inhibit and/or remove ice formation on the filter 54 or elsewhere in the air intake system 12 and/or in the compressor 16.

Figure 2:
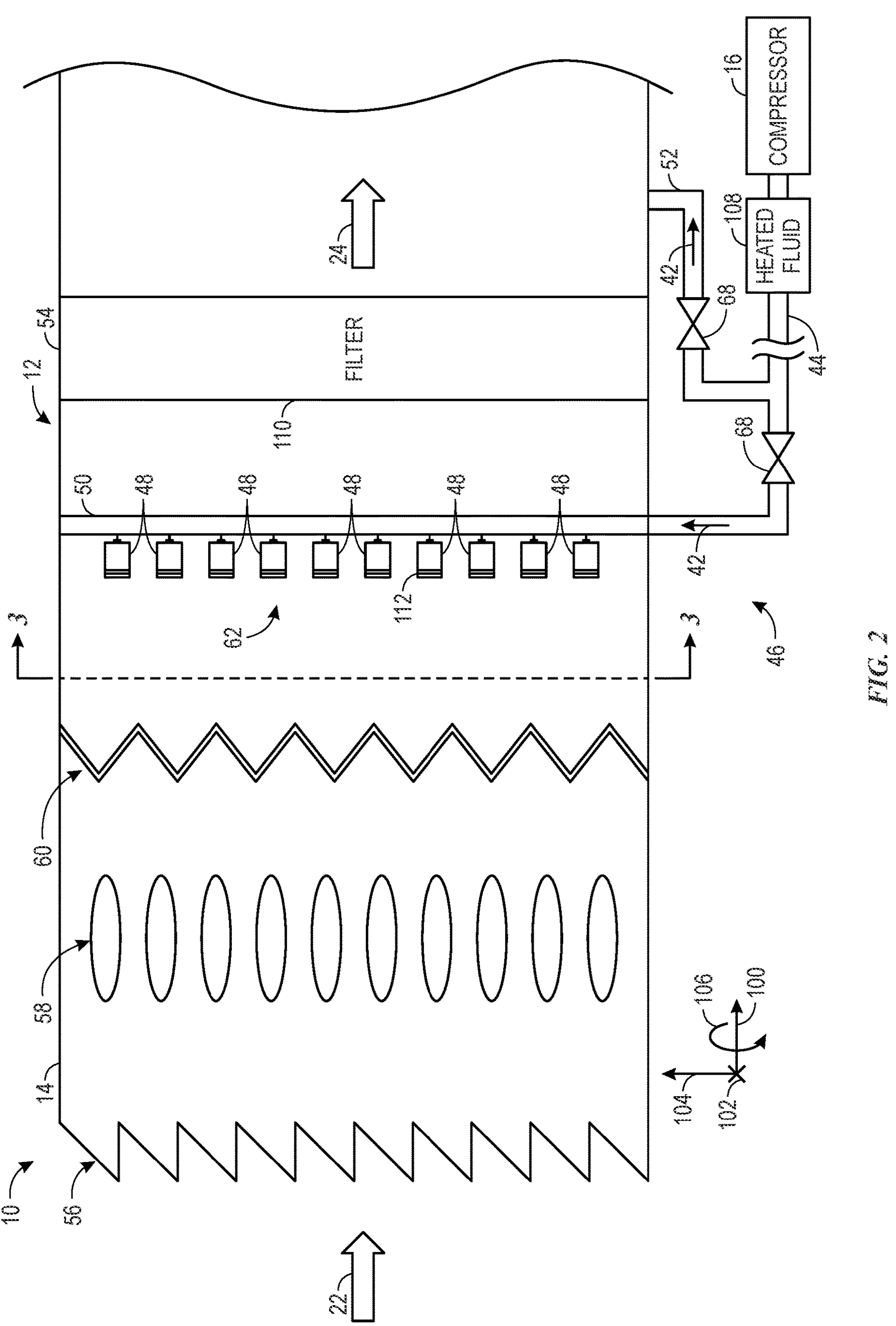
FIG. 2 is a schematic of a portion of an anti-icing system that may be used in the air intake system of FIG. 1, in accordance with an embodiment.

FIG. 2 is a schematic of an embodiment of the anti-icing system 46 coupled to the air intake system 12. To facilitate discussion, the anti-icing system 46 and the air intake system 12 may be described with reference to a longitudinal axis or direction 100, a lateral axis or direction 102, a vertical axis or direction 104, and/or a circumferential axis or direction 106.

As shown, the anti-icing system 46 includes the anti-icing assembly 62 having the nozzles 48, the manifold 50, and the bypass conduit 52. The airflow 22 enters the air intake system 12 through the air hood 56, which may include multiple angled baffles to block entry of rain or snow. The airflow 22 may also pass through multiple silencer baffles 58 and/or coalescers 60 upstream of the anti-icing assembly 62. The silencer baffles 58 have one or more acoustic attenuation features (e.g., acoustic attenuation surface features, internal material) to help reduce acoustic noise caused by the airflow 22 passing through the air intake system 12. The coalescers 60 are configured to remove water from the airflow 22. The coalescers 60 may include mechanical coalescers, electrostatic coalescers, or a combination thereof.

After the airflow 22 mixes with the heated fluid to form the heated airflow 24, the heated airflow 24 may then pass through the filter 54. The filter 54 may include any number and type of filters. The filter 54 may be configured to filter particulate and moisture; however, the filter 54 may be susceptible to ice formation at certain low temperatures and/or heat damage at certain high temperatures. Although the above components are illustrated in a sequence (e.g., upstream to downstream) in the air intake conduit 14, various embodiments may rearrange the foregoing components in any suitable order, except that the nozzles 48 and manifold 50 remain upstream from the filter 54, and the one or more bypass conduits 52 inject heated fluid 108 into the air intake conduit 14 downstream of the filter 54. In some embodiments, the bypass conduit 52 may be fluidly coupled to a second manifold and/or second set of nozzles for injecting the heated fluid 108 into the intake conduit 14 downstream of the filter 54.

As shown, heated fluid 108 extracted from the compressor 16 flows through the bleed conduit 44 of the anti-icing system 46. The compressor extraction may be 1%, 2%, 3%, 4%, 5%, 6%, 7%, 8%, 9%, 10%, 12%, 15%, 20%, or any other percentage of the total airflow 22 into the compressor 16, regardless of the load of the gas turbine system 10 and the ambient conditions. By way of example, a typical compressor extraction may be 6% at a gas turbine load of 80% on a cold day, and the same compressor extraction percentage (6%) may also be used at a gas turbine load of 30% on a hot day. Thus, the % flow through the bleed conduit 44 is calculated with respect to the compressor flow at a given operating condition, which itself may vary with load and with ambient conditions.

In some embodiments, one or more valves 68 may control the flow of heated fluid 108 through the bleed conduit 44 and into the manifold 50 and/or the bypass conduit 52. In some embodiments, as shown and described with regard to FIG. 1, the anti-icing system 46 may include three valves 68-*a* first valve 68 fluidly coupled to the bleed conduit 44 and configured to control the flow of heated fluid 42 through the bleed conduit 44, a second valve 68 fluidly coupled to the manifold 50 and configured to control the flow of heated fluid 42 into the manifold 50, and a third valve 68 fluidly coupled to the bypass conduit 52 and configured to control the flow of heated fluid 42 through the bypass conduit 52. However, it should be understood that other embodiments are also envisaged. For example, the anti-icing system 46 may include two valves 68-*a* first valve 68 fluidly coupled to either the bleed conduit 44 (and configured to control the flow of heated fluid 108 through the bleed conduit 44) or the manifold 50 (and configured to control the flow of heated fluid 108 into the manifold 50), and a second valve 68 fluidly coupled to the bypass conduit 52 (and configured to control the flow of heated fluid 108 through the bypass conduit 52). Alternatively, in some embodiments the anti-icing system 46 may utilize a single valve (e.g., disposed at or near a junction of the bleed conduit 44 and the bypass conduit 52) configured to control the flow of heated fluid 108 into the manifold 50 and into the bypass conduit 52. As shown and described with regard to FIG. 1, the valve(s) 68 may be controlled by the controller 66.

The manifold 50 may receive a flow of the heated fluid 108 from the bleed conduit 44 and provide the heated fluid 108 to the nozzles 48 for injection into the air intake conduit 14, upstream of the filter 54, to heat the airflow 22. Meanwhile, the bypass conduit 52 may receive a flow of the heated fluid 108 from the bleed conduit 44 and inject the heated fluid 108 into the air intake conduit 14 (e.g., via one or more nozzles or other fluid delivery mechanisms) downstream of the filter 54, to further heat the airflow 22 before the airflow arrives at the intake of the compressor 16.

In some embodiments, as discussed above, the flow of heated fluid 108 through the manifold 50 and the bypass conduit 52 may be controlled via the one or more valves 68 to achieve desired set of conditions of the heated airflow 24. For example, the operator may wish for the temperature of the heated airflow 24 to fall within a desired temperature range. In such an embodiment, the lower bounds of the desired temperature range may be a temperature that is sufficiently high to reduce or eliminate icing on a face 110 of the filter. Such a lower bounds temperature may be an absolute temperature, or a temperature determined based on the dew point of the airflow. For example, the lower bounds of the desired temperature range may be at (equal to) the dew point of the airflow, 1 degree Celsius above the dew point, 2 degrees Celsius above the dew point, 3 degrees Celsius above the dew point, 4 degrees Celsius above the dew point, 5 degrees Celsius above the dew point, 6 degrees Celsius above the dew point, 7 degrees Celsius above the dew point, 8 degrees Celsius above the dew point, 9 degrees Celsius above the dew point, 10 degrees Celsius above the dew point, 11 degrees Celsius above the dew point, 12 degrees Celsius above the dew point, 13 degrees Celsius above the dew point, 14 degrees Celsius above the dew point, 15 degrees Celsius above the dew point, 16 degrees Celsius above the dew point, 17 degrees Celsius above the dew point, 18 degrees Celsius above the dew point, 19 degrees Celsius above the dew point, 20 degrees Celsius above the dew point, 25 degrees Celsius above the dew point, 30 degrees Celsius above the dew point, 35 degrees Celsius above the dew point, 40 degrees Celsius above the dew point, or any other temperature.

The upper bounds of the desired temperature range may be a temperature that is not sufficiently high as to cause or induce melting on the face 110 of the filter 54 or other damage to the filter. Such an upper bounds temperature may be an absolute temperature, such as 65 degrees Celsius, 66 degrees Celsius, 67 degrees Celsius, 68 degrees Celsius, 69 degrees Celsius, 70 degrees Celsius, 71 degrees Celsius, 72 degrees Celsius, 73 degrees Celsius, 74 degrees Celsius, 75 degrees Celsius, 76 degrees Celsius, 77 degrees Celsius, 78 degrees Celsius, 79 degrees Celsius, 80 degrees Celsius, 81 degrees Celsius, 82 degrees Celsius, 83 degrees Celsius, 84 degrees Celsius, 85 degrees Celsius, 86 degrees Celsius, 87 degrees Celsius, 88 degrees Celsius, 89 degrees Celsius, 90 degrees Celsius, or any other temperature.

Further, the nozzles 48 may be arranged and the flow of heated fluid 108 through the manifold 50 and the bypass conduit 52 may be controlled via the valves 68 to achieve a temperature uniformity of 50%, 51% 52%, 53%, 54%, 55%, 56%, 57%, 58%, 59%, 60%, 61%, 62%, 63%, 64%, 65%, or any other number. As used herein, "temperature uniformity" refers to a temperature distribution over a prescribed (typically small) range at or near a face 110 of the filter 54. To achieve such results, the nozzles 48 may occupy a set percentage of a cross-sectional area of the air intake conduit 14 and/or a cross-sectional area of the face 110 of the filter 54. For example, the multiple nozzles 48 may occupy 50%, 51%, 52%, 53%, 54%, 55%, 56%, 57%, 58%, 59%, 60%, or any other percentage of the cross-sectional area of the air intake conduit 14 and/or the cross-sectional area of the face 110 of the filter 54. As shown in FIG. 2, the nozzles 48 may be disposed upstream of the filter 54 with respect to the airflow (e.g., in direction 100). For example, the nozzles 48 may be disposed within 4 meters of the filter 54, 3 meters of the filter 54, 2 meters of the filter 54, 1 meter of the filter 54, 0.5 meters of the filter 54, 0.25 meters of the filter 54, or some other distance from the filter 54, which does not create an unacceptably large pressure drop in the airflow while still enabling the desired temperature rise and uniformity.

As previously described, the anti-icing system 46 may be configured to partially heat the airflow 22 upstream of the filters 54 and then further heat the heated airflow 24 downstream of the filters 54. Accordingly, anti-icing system 46 may be operated to heat the airflow 22 to achieve the heated airflow 24 having the set of the desirable characteristics, so as to reduce and/or eliminate icing on the face 110 of the filter 54, while reducing and/or eliminating melting and/or other damage to the filter 54, and also to allow additional heating of the airflow downstream of the filters 54. For example, by controlling the flowrate of heated fluid 108 through the manifold 50 and the bypass conduit 52 using the valves 68, the heating of the airflow 22 upstream and downstream of the filters 54 may be controlled.

In the illustrated embodiment, the heated fluid 108 includes the compressed airflow extracted from the compressor 16, as discussed above with reference to FIG. 1. The compressed air from the compressor 16 may be approximately 200 to 600 degrees Celsius, having approximate pressures of 800 to 900 Kilopascals. However, the anti-icing system 46 may directly or indirectly use any one or more heated fluids to elevate the temperature of the airflow 22. For example, as illustrated, the heated fluid 108 may be any suitable heated fluid that can be directed through the manifold 50 and the bypass conduit 52 to elevate the temperature of the airflow 22, including, but not limited to, a heated air from the compressor 16, a heated gas from another source, or exhaust gas.

As previously described, the mixing of the airflow 22 and the heated fluid 108 forms the heated airflow 24 and provides a more uniform, desirable temperature of the heated airflow 24 at the face 110 (e.g., longitudinally facing surface; upstream surface) of the filter 54 to thereby mitigate or prevent the buildup of ice at the filter 54 and/or in other regions of the air intake system 12. The nozzles 48 may be arranged in the lateral direction 102 and in the vertical direction 104 (e.g., spaced apart in a grid-like pattern). In the illustrated embodiment, each nozzle 48 is coupled to the manifold 50 on an upstream side of the manifold 50, such that the manifold 50 is positioned between the nozzle 48 and the filter 54 in the longitudinal direction 100. However, it should be appreciated that each nozzle 48 may be coupled to the manifold 50 on a downstream side of the manifold 50, such that the nozzle 48 is positioned between the manifold 50 and the filter 54 in the longitudinal direction 100.

Each nozzle 48 includes one or more outlets 112. The outlets 112 may have any suitable form. For example, the outlets 112 may include one or more continuous rings that extend circumferentially about the nozzle 48 (as shown), or the outlets 112 may be discrete openings spaced circumferentially about the nozzle 48. The outlets 112 may also be positioned at any suitable location between a first, upstream end of the nozzle 48 and a second, downstream end of the nozzle 48 (e.g., any suitable location in the longitudinal direction 100). For example, the outlets 112 may be positioned proximate to the first, upstream end (e.g., closer to the first, upstream end) to provide more space (e.g., distance in the longitudinal direction 100; as compared to being positioned proximate to the second, downstream end) for mixing of the airflow 22 and the heated fluid 108 upstream of the filter 54. It should be appreciated that the placement of the nozzles 48 on the upstream side of the manifold 50 also provides more space (e.g., distance in the longitudinal direction 100; as compared to each nozzle 48 being coupled to the manifold on the downstream side of the manifold 50) for mixing the airflow 22 and the heated fluid 108 upstream of the filter 54. Thus, the components of the anti-icing assembly 62 may be arranged to provide an efficient anti-icing process within a given size of the air intake conduit 14 (e.g., that has limited space within the air intake conduit 14; retrofitted) and/or may enable use of a smaller size air intake conduit 14 (e.g., as compared to air intake conduits that are devoid of the anti-icing assembly 62). Regardless of their form and/or position, the outlets 112 may inject (e.g., spray) the heated fluid 108 radially-outwardly from the nozzle 48 and/or crosswise to the airflow 22.

Figure 3:
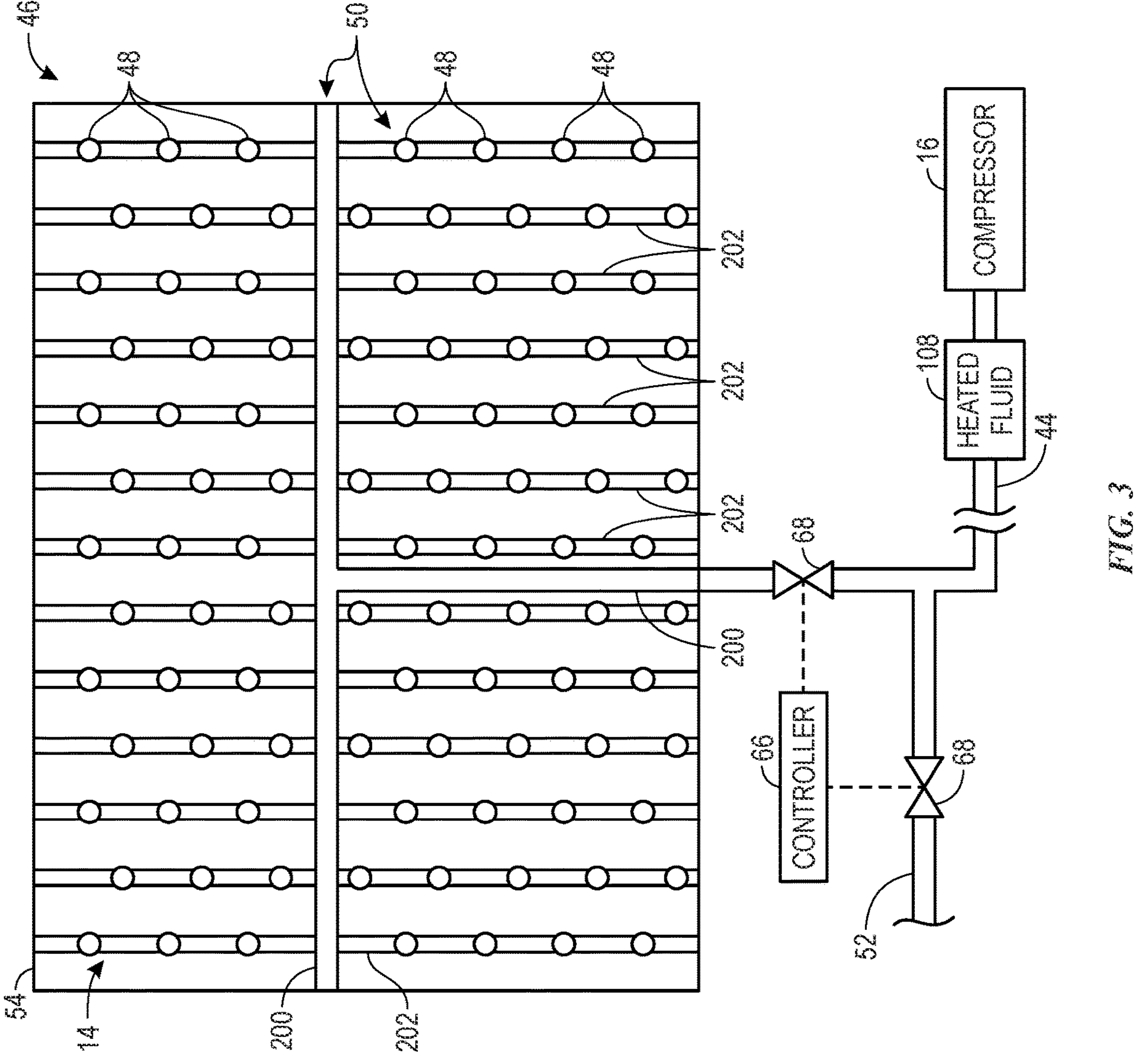
FIG. 3 is a schematic of the anti-icing system taken across line 3-3 of FIG. 2.

FIG. 3 is a schematic illustration of the anti-icing system 46 taken across the air intake conduit 14 as indicated by line 3-3 of FIG. 2, illustrating the nozzles 48 and various conduits 200, 202 of the manifold 50 positioned across the flow path in the air intake conduit 14 in accordance with an embodiment. In the illustrated embodiment, the conduits 200, 202 of the manifold 50 include a primary branch or supply conduit 200 and a plurality of secondary branches or distribution conduits 202. The illustrated supply conduit 200 may include includes a first supply conduit portion and a second supply conduit portion, wherein the first and second supply conduit portions are oriented crosswise relative to another (e.g., defining a T-shaped conduit). For example, the first supply conduit portion may be a vertical conduit portion while the second supply conduit portion may be a horizontal conduit portion. The distribution conduits 202 are mechanically and fluidly coupled to the supply conduit 200 (e.g., at the second supply conduit portion).

In the illustrated embodiment, the distribution conduits 202 are arranged parallel (or substantially parallel) to one another with a uniform spacing between the adjacent distribution conduits 202. The plurality of nozzles 48 may be coupled to the plurality of distribution conduits 202 and/or the supply conduit 200. The plurality of nozzles 48 may be uniformly spaced relative to one another to define a two-dimensional grid across the air intake conduit 14 upstream of the filter 54. In the illustrated embodiment, the plurality of nozzles 48 are staggered relative to one another from one distribution conduit 202 to another. In some embodiments, the plurality of nozzles 48 may be aligned with one another from one distribution conduit 202 to another.

Figure 4:
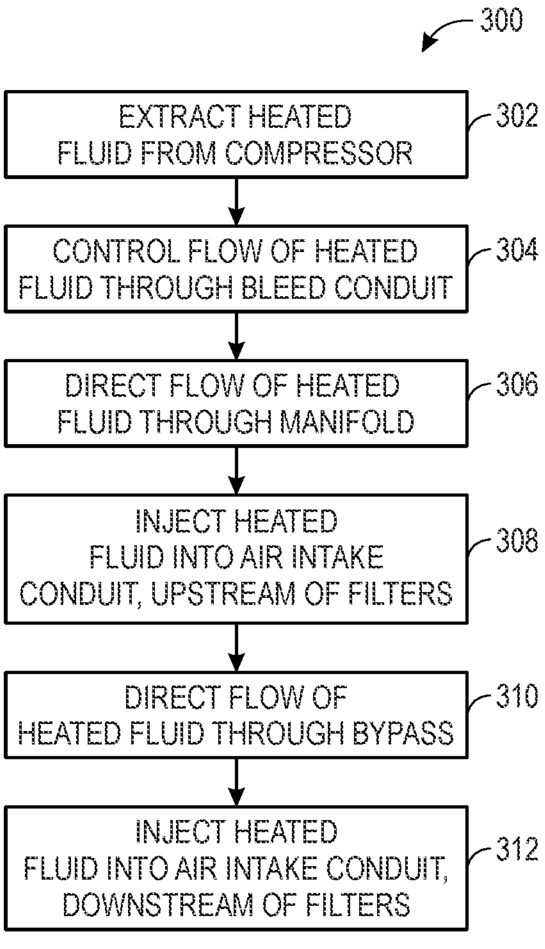
FIG. 4 is a flow chart of a process for operating the inti-icing system of FIGS. 1-3, in accordance with an embodiment.

FIG. 4 is a flow chart of a process 300 for operating the inti-icing system 46 shown in FIGS. 1-3. At block 302, heated fluid is extracted from the compressor 16. The compressor extraction may be 1%, 2%, 3%, 4%, 5%, 6%, 7%, 8%, 9%, 10%, 12%, 15%, 20%, or any other percentage of the total airflow 22 into the compressor 16 at the operating condition of the gas turbine system 10. The compressed air from the compressor 16 may be approximately 200 to 600 degrees Celsius, having approximate pressures of 800 to 900 Kilopascals. However, one or more other heated fluids may also be utilized. For example, the heated fluid may include any suitable heated fluid that can be directed through the anti-icing system 46 to elevate the temperature of the airflow 22, including, but not limited to, a heated air from the compressor 16, a heated gas from another source, or exhaust gas.

At block 304, the heated fluid 42, 108 is directed through a bleed conduit 52, and the flow of the heated fluid 42, 108 through the bleed conduit 52 is controlled. For example, the flow of the heated fluid 42, 108 through the bleed conduit 52 may be controlled by the controller 66 via one or more valves 68 based on sensor 64 readings. If the temperature at one or more of the sensors 64 falls below a lower temperature threshold (e.g., 0 degrees Celsius, the dew point of the ambient air, or other some threshold temperature above the dew point of the ambient air, etc.), then the controller 66 may send a control signal to an actuator (e.g., an electric actuator) of the valve 68 to partially or entirely open the valve 68 to enable a flow of the heated fluid 42, 108 to pass through the bleed conduit 52. Correspondingly, if the temperature at one or more of the sensors 64 exceeds an upper temperature threshold (e.g., a maximum temperature of air that can flow through the filters 54 without damaging the filters 54, some other threshold temperature below the maximum temperature of air that can flow through the filters 54 without damaging the filters 54, etc.), then the controller 66 may send a control signal to the actuator of the valve 68 to partially or entirely close the valve 68 to slow or stop the flow of the heated fluid 42, 108 through the bleed conduit 52.

For example, a desired temperature range may be provided for the heated airflow 42, 108. In such an embodiment, the lower bounds of the desired temperature range may be a temperature that is sufficiently high to reduce or eliminate icing on a face 110 of the filter 54. Such a lower bounds temperature may be an absolute temperature or a temperature determined based on the dew point of the airflow 22. For example, the lower bounds of the desired temperature range may be at (equal to) the dew point of the airflow, 1 degree Celsius above the dew point, 2 degrees Celsius above the dew point, 3 degrees Celsius above the dew point, 4 degrees Celsius above the dew point, 5 degrees Celsius above the dew point, 6 degrees Celsius above the dew point, 7 degrees Celsius above the dew point, 8 degrees Celsius above the dew point, 9 degrees Celsius above the dew point, 10 degrees Celsius above the dew point, 11 degrees Celsius above the dew point, 12 degrees Celsius above the dew point, 13 degrees Celsius above the dew point, 14 degrees Celsius above the dew point, 15 degrees Celsius above the dew point, 16 degrees Celsius above the dew point, 17 degrees Celsius above the dew point, 18 degrees Celsius above the dew point, 19 degrees Celsius above the dew point, 20 degrees Celsius above the dew point, 25 degrees Celsius above the dew point, 30 degrees Celsius above the dew point, 35 degrees Celsius above the dew point, 40 degrees Celsius above the dew point, or any other temperature.

The upper bounds of the desired temperature range may be a temperature that is not sufficiently high as to cause or induce melting on the face 110 of the filter 54 or other damage to the filter 54. Such an upper bounds temperature may be an absolute temperature, such as 65 degrees Celsius, 66 degrees Celsius, 67 degrees Celsius, 68 degrees Celsius, 69 degrees Celsius, 70 degrees Celsius, 71 degrees Celsius, 72 degrees Celsius, 73 degrees Celsius, 74 degrees Celsius, 75 degrees Celsius, 76 degrees Celsius, 77 degrees Celsius, 78 degrees Celsius, 79 degrees Celsius, 80 degrees Celsius, 81 degrees Celsius, 82 degrees Celsius, 83 degrees Celsius, 84 degrees Celsius, 85 degrees Celsius, 86 degrees Celsius, 87 degrees Celsius, 88 degrees Celsius, 89 degrees Celsius, 90 degrees Celsius, or any other temperature.

At block 306, the flow of heated fluid 42, 108 is directed through the manifold 50. The manifold 50 receives the flow of heated fluid 42, 108 from the bleed conduit 44 and provides the heated fluid 42, 108 to one or more nozzles 48. In embodiments having multiple nozzles 48, the manifold 50 may separate the flow of heated fluid into multiple flows of heated fluid 42, 108 and then provide those multiple flows of heated fluid 42, 108 to the multiple nozzles 48. As previously described, in some embodiments, the flow of the heated fluid 42, 108 through the manifold 50 may be controlled by one or more valves 68. The valves 68 may be controlled by the controller 66 to heat the airflow to achieve the heated airflow having desired temperature ranges upstream and downstream of the filter 54.

At block 308, the flow of heated fluid 42, 108 is directed into the air intake conduit 14 via the nozzles 48. The heated fluid from the nozzles 48 acts to heat the airflow 22 as the airflow 22 flows between, around, and/or by the nozzles 48, resulting in the heated airflow. The nozzles 48 may be arranged and the flow of heated fluid 42, 108 through the nozzles 48 may be controlled to achieve a temperature uniformity of 50%, 51% 52%, 53%, 54%, 55%, 56%, 57%, 58%, 59%, 60%, 61%, 62%, 63%, 64%, 65%, or any other number at or near a face 110 of a filter 54, which does not create an unacceptably large pressure drop in the airflow while still enabling the desired temperature rise and uniformity. To achieve such results, the nozzles 48 may occupy a set percentage of a cross-sectional area of the air intake conduit 14 and/or a cross-sectional area of the face 110 of the filter 54. For example, the nozzles 48 may occupy 50%, 51%, 52%, 53%, 54%, 55%, 56%, 57%, 58%, 59%, 60%, or any other percentage of the cross-sectional area of the air intake conduit and/or the cross-sectional area of the face 110 of the filter 54, which enables desired heating of the airflow without adversely impacting pressure drop of the airflow.

Further, the nozzles 48 may be disposed upstream of the filter 54 with respect to the airflow. For example, the nozzles 48 may be disposed within 4 meters of the filter 54, 3 meters of the filter 54, 2 meters of the filter 54, 1 meter of the filter 54, 0.5 meters of the filter 54, 0.25 meters of the filter 54, or some other distance from the filter 54. In embodiments with more than one filter, such distances are intended to refer to the distance between the multiple finned conduits and the closest (i.e., most upstream) filter.

At block 310, the heated fluid 42, 108 is directed through the bypass conduit 52. The bypass conduit 52 receives the flow of heated fluid from the bleed conduit 44 and provides the heated fluid 42, 108 to the air intake conduit 14 (e.g., block 312, via one or more nozzles 48 or outlets), downstream of the one or more filters 54. In some embodiments, the heated fluid 42, 108 may be provided to the intake conduit 14 at multiple locations (e.g., around the perimeter of the air intake conduit, at one or more interior locations, and/or some combination thereof). As previously described, in some embodiments, the flow of the heated fluid 42, 108 through the bypass conduit 52 may be controlled by one or more valves 68. The valves 68 may be controlled by the controller 66 to heat the airflow to achieve the heated airflow having desired temperature ranges upstream and downstream of the filter 54. Injecting the heated fluid 42, 108 into the air intake conduit 14 downstream of the filter(s) 54 may further heat the airflow downstream of the filter(s) 54. Accordingly, the anti-icing system 46 may be configured to partially heat the airflow upstream of the filter(s) 54 and then further heat the heated airflow downstream of the filter(s) 54.

Air from the air intake conduit 14 subsequently flows into the compressor 16. For example, if the heated airflow is nearing, at, or beyond a desired range at or near the face 110 of the filter 54, but below a desired range at or near the inlet of the compressor 16, the controller 66 may be configured to adjust the valves 68 to reduce the flow rate of heated fluid 42, 108 to the manifold 50 and/or increase the flow rate of heated fluid 42, 108 to the bypass conduit 52. If the heated airflow is below a desired range at or near the face 110 of the filter 54, the controller 66 may be configured to adjust the valves 68 to increase the flow rate of heated fluid 42, 108 to the manifold 50 and/or decrease the flow rate of heated fluid 42, 108 to the bypass conduit 52. If the heated airflow is below a desired range at or near the face 110 of the filter 54 and is below a desired range at or near the inlet of the compressor 16, the controller 66 may be configured to adjust the valves 68 to increase the flow rate of heated fluid 42, 108 to the manifold 50 and/or increase the flow rate of heated fluid 42, 108 to the bypass conduit 52. If the heated airflow is above a desired range at or near the face of the filter 54 and is above a desired range at or near the inlet of the compressor 16, the controller 66 may be configured to adjust the valves 68 to reduce the flow rate of heated fluid 42, 108 to the manifold 50 and/or reduce the flow rate of heated fluid 42, 108 to the bypass conduit 52.

The present disclosure includes a gas turbine system that receives an airflow (e.g., ambient airflow) through an air intake system, which directs the airflow to a compressor of the gas turbine system. The disclosed embodiments relate to an anti-icing system that is configured to block a buildup of ice on a filter within the air intake system. The anti-icing system includes nozzles configured to inject heated fluid to heat the airflow in order to form a heated airflow that increases a temperature adjacent to the filter within the air intake system and that prevents the buildup of ice on the filter within the air intake system, as well as a bypass conduit that provides heated fluid to the air intake conduit downstream of the filter. The anti-icing system may also include a bleed conduit for directing a flow of heated fluid extracted from the compressor toward the air intake of the gas turbine system. The bleed conduit may include one or more valves, which may be controlled by a controller, to control the flow of heated fluid through the bleed conduit and into a manifold fluidly coupled to the nozzles. The manifold may receive a flow of heated fluid and distribute the flow of heated fluid to multiple nozzles. The bypass conduit may also include one or more valves, which may be controlled by the controller, and may be configured to receive a flow of heated fluid and to inject the heated fluid into the air intake conduit downstream of the filters to further heat the airflow after it passes through the filters.

While the anti-icing system is generally described as being used during cold ambient conditions to heat the airflow using the heated fluid to increase the temperature of the airflow (e.g., to turn the airflow into the heated airflow for anti-icing functionality), it should be appreciated that the anti-icing system may be more generally referred to as an inlet bleed heat (IBH) system and may also advantageously exchange heat between the airflow and the heated fluid in a manner that blocks extremely high temperatures (e.g., hot spots that exceed a high temperature limit for the filter) at the filter of the air intake system during other conditions (e.g., hot ambient conditions and/or IBH maximum flow conditions). Thus, the anti-icing system may also protect the filter from the extremely high temperatures that may otherwise result in early degradation of material of the filter and/or damage (e.g., burn) of the material of the filter.

For example, the anti-icing system may heat the airflow such that at least 55 percent (or at least 60, 70, 80, 90, or 95 percent) of the face of the filter is heated by the heated airflow having a respective temperature that is at least 2 degrees Celsius (or at least 3, 4, or 5 degrees Celsius) greater than a dew point temperature of the air, and the anti-icing system may also heat the airflow by injecting the heated fluid such that less than 50 percent (or less than 40, 30, 20, 10, or 5 percent) of the face of the filter is heated to the extremely high temperatures (e.g., hot spots of more than 75 or 80 degrees Celsius extend across less than 50 percent of the face of the filter or are completely eliminated).

The technical effects of the anti-icing techniques disclosed herein include providing more effective heating of the airflow using the heated fluid within the air intake system. Under certain conditions (e.g., cold ambient conditions), the mixing may result in more effective removal, reduction, and/or blocking of ice buildup on the filter of the air intake system of the gas turbine system as compared to traditional systems. Under certain conditions (e.g., hot ambient conditions and/or IBH maximum flow), the heat transfer may result in more effective reduction and/or blocking of hot spots on the filter of the air intake system of the gas turbine system as compared to traditional systems. The anti-icing assembly may be cost-effective in that the components may be configured to fit within and/or interface with existing anti-icing systems and/or existing air intake systems (e.g., facilitating retrofit).

The subject matter described in detail above may be defined by one or more clauses, as set forth below.

An anti-icing system for a gas turbine system, the anti-icing system includes a plurality of nozzles and a bypass conduit. Each nozzle of the plurality of nozzles includes one or more outlets that are configured to inject a first portion of a heated fluid into an airflow within an air intake conduit of the gas turbine system upstream of a filter. The bypass conduit is configured to direct a second portion of the heated fluid into the airflow within the air intake conduit downstream of the filter.

The anti-icing system of the preceding clause, wherein the plurality of nozzles is coupled to a manifold that is configured to distribute the heated fluid to the plurality of nozzles.

The anti-icing system of any preceding clause, wherein the plurality of nozzles is arranged as a two-dimensional grid and is positioned upstream of the manifold.

The anti-icing system of any preceding clause, wherein the plurality of nozzles is configured to heat the airflow within the air intake conduit of the gas turbine system to a first temperature greater than a threshold temperature above a dew point of the airflow through the air intake conduit of the gas turbine system at a location at or upstream of a face of the filter.

The anti-icing system of any preceding clause, wherein the plurality of nozzles is configured to heat the airflow within the air intake conduit of the gas turbine system to a temperature less than a second threshold temperature at the location at or upstream of the face of the filter.

The anti-icing system of any preceding clause, including one or more sensors configured to measure a temperature of the airflow at one or more locations within the air intake conduit.

The anti-icing system of any preceding clause, including a first valve configured to control a first flow rate of the first portion of the heated fluid into the manifold.

The anti-icing system of any preceding clause, including a second valve configured to control a second flow rate of the second portion of the heated fluid through the bypass conduit.

The anti-icing system of any preceding clause, including a third valve configured to control a third flow rate of the heated fluid through a bleed conduit, wherein the bleed conduit is fluidly coupled to the manifold, the bypass conduit, and a compressor of the gas turbine system.

The anti-icing system of any preceding clause, wherein the heated fluid is extracted from the compressor of the gas turbine system through the bleed conduit based on a compressor extraction of 6% of total compressor airflow.

The anti-icing system of any preceding clause, including a controller configured to control operation of the first valve, the second valve, and the third valve.

The anti-icing system of any preceding clause, including a controller configured to control operation of the first and second valves based on measurements by the one or more sensors.

A gas turbine system includes a compressor and an air intake system. The air intake system includes an air intake conduit, a filter system, and an anti-icing system. The air intake system is configured to supply a heated airflow to the compressor. The anti-icing system includes a plurality of nozzles and a bypass conduit. Each nozzle of the plurality of nozzles includes one or more outlets that are configured to inject a first portion of a heated fluid into an airflow within the air intake conduit upstream of the filter system. The bypass conduit is configured to direct a second portion of the heated fluid into the airflow within the air intake conduit downstream of the filter system.

The gas turbine system of the preceding clause, wherein the heated fluid includes compressed air bled from the compressor of the gas turbine system through a bleed conduit fluidly coupled to the anti-icing system.

The gas turbine system of any preceding clause, wherein the anti-icing system includes a first valve configured to control a first flow rate of the first portion of the heated fluid through the bypass conduit, a second valve configured to control a second flow rate of the second portion of the heated fluid to the plurality of nozzles, one or more sensors configured to measure a temperature of the airflow at one or more locations within the air intake conduit, and a controller configured to control operation of the first and second valves based on measurements by the one or more sensors.

A method of operating an anti-icing system for a gas turbine system includes extracting a heated fluid from a compressor of the gas turbine system, injecting, via a plurality of nozzles, a first portion of the heated fluid into an airflow within an air intake conduit of the gas turbine system upstream of a filter, and injecting, from a bypass conduit, a second portion of the heated fluid into the airflow within the air intake conduit of the gas turbine system downstream of the filter.

The method of the preceding clause, including receiving, from one or more sensors disposed within the air intake conduit of the gas turbine system, one or more measurements representative of a measured temperature of the airflow at one or more locations within the air intake conduit, controlling operation of a first valve configured to control a first flow rate of the first portion of the heated fluid to the plurality of nozzles, and controlling operation of a second valve configured to control a second flow rate of the second portion of the heated fluid through the bypass conduit.

The method of any preceding clause, wherein injecting the first portion of the heated fluid is configured to heat the airflow within the air intake conduit of the gas turbine system to a first temperature greater than a first threshold temperature above a dew point of the airflow through the air intake conduit of the gas turbine system, but less than a second threshold temperature at a location at or upstream of a face of the filter.

This written description uses examples to disclose the embodiments of the present disclosure, including the best mode, and also to enable any person skilled in the art to practice the embodiments of the present disclosure, including making and using any devices or systems and performing any incorporated methods. The patentable scope of the present disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An anti-icing system for a gas turbine system, the anti-icing system comprising:
- a plurality of nozzles, wherein each nozzle of the plurality of nozzles comprises one or more outlets that are configured to inject a first portion of a heated fluid into an airflow within an air intake conduit of the gas turbine system upstream of a filter;
- a first valve configured to control a first flow rate of the first portion of the heated fluid into the plurality of nozzles;
- a bypass conduit configured to direct a second portion of the heated fluid into the airflow within the air intake conduit downstream of the filter and upstream of a compressor of the gas turbine system;
- a second valve configured to control a second flow rate of the second portion of the heated fluid through the bypass conduit; and
- a controller configured to adjust the first valve and the second valve to adjust a ratio of the first flow rate to the second flow rate.

2. The anti-icing system of claim 1, wherein the plurality of nozzles is coupled to a manifold that is configured to distribute the heated fluid to the plurality of nozzles.

3. The anti-icing system of claim 2, wherein the plurality of nozzles is arranged as a two-dimensional grid and is positioned upstream of the manifold.

4. The anti-icing system of claim 1, wherein the plurality of nozzles is configured to heat the airflow within the air intake conduit of the gas turbine system to a first temperature greater than a threshold temperature above a dew point of the airflow through the air intake conduit of the gas turbine system at a location at or upstream of a face of the filter.

5. The anti-icing system of claim 4, wherein the plurality of nozzles is configured to heat the airflow within the air intake conduit of the gas turbine system to a temperature less than a second threshold temperature at the location at or upstream of the face of the filter.

6. The anti-icing system of claim 2, comprising one or more sensors configured to measure a temperature of the airflow at one or more locations within the air intake conduit.

7. The anti-icing system of claim 6, comprising a third valve configured to control a third flow rate of the heated fluid through a bleed conduit, wherein the bleed conduit is fluidly coupled to the manifold, the bypass conduit, and the compressor of the gas turbine system.

8. The anti-icing system of claim 7, wherein the heated fluid extracted from the compressor of the gas turbine system through the bleed conduit is equal to 6% of total compressor flow.

9. The anti-icing system of claim 7, wherein the controller is configured to control operation of the third valve.

10. The anti-icing system of claim 9, wherein the controller is configured to control operation of the first valve and second valve based on measurements by the one or more sensors.

11. A gas turbine system, comprising:
- a compressor; and
- an air intake system comprising an air intake conduit, a filter system, and an anti-icing system, wherein the air intake system is configured to supply a heated airflow to the compressor, and wherein the anti-icing system comprises:
  - a plurality of nozzles, wherein each nozzle of the plurality of nozzles comprises one or more outlets that are configured to inject a first portion of a heated fluid into an airflow within the air intake conduit upstream of the filter system;
  - a bypass conduit configured to direct a second portion of the heated fluid into the airflow within the air intake conduit downstream of the filter system and upstream of the compressor of the gas turbine system;
  - a first valve configured to control a first flow rate of the first portion of the heated fluid through the bypass conduit;
  - a second valve configured to control a second flow rate of the second portion of the heated fluid to the plurality of nozzles; and
  - a controller configured to adjust the first valve and the second valve to adjust a ratio of the first flow rate to the second flow rate.

12. The gas turbine system of claim 11, wherein the heated fluid comprises compressed air bled from the compressor of the gas turbine system through a bleed conduit fluidly coupled to the anti-icing system.

13. The gas turbine system of claim 11, wherein the anti-icing system comprises
- one or more sensors configured to measure a temperature of the airflow at one or more locations within the air intake conduit,
- wherein the controller is configured to control operation of the first valve and the second valve based on measurements by the one or more sensors.

14. A method of operating an anti-icing system for a gas turbine system, comprising:
- extracting a heated fluid from a compressor of the gas turbine system;
- injecting, via a plurality of nozzles, a first portion of the heated fluid into an airflow within an air intake conduit of the gas turbine system upstream of a filter;
- injecting, from a bypass conduit, a second portion of the heated fluid into the airflow within the air intake conduit of the gas turbine system downstream of the filter and upstream of the compressor of the gas turbine system; and controlling operation of a first valve configured to control a first flow rate of the first portion of the heated fluid to the plurality of nozzles and a second valve configured to control a second flow rate of the second portion of the heated fluid through the bypass conduit to adjust a ratio of the first flow rate to the second flow rate.

15. The method of claim 14, comprising:

receiving, from one or more sensors disposed within the air intake conduit of the gas turbine system, one or more measurements representative of a measured temperature of the airflow at one or more locations within the air intake conduit; and controlling operation of the first valve and the second valve based on the one or more measurements.

16. The method of claim 15, wherein injecting the first portion of the heated fluid is configured to heat the airflow within the air intake conduit of the gas turbine system to a first temperature greater than a first threshold temperature above a dew point of the airflow through the air intake conduit of the gas turbine system, but less than a second threshold temperature at a location at or upstream of a face of the filter.

17. The anti-icing system of claim 1, wherein the controller is configured to adjust the first valve to reduce the first flow rate and adjust the second valve to increase the second flow rate in response to a measured temperature in the air intake conduit, between the plurality of nozzles and the filter exceeding an upper threshold temperature.

18. The anti-icing system of claim 1, wherein the controller is configured to adjust the first valve to increase the first flow rate and adjust the second valve to decrease the second flow rate in response to a measured temperature in the air intake conduit, between the plurality of nozzles and the filter being below a lower threshold temperature.

* * * * *